United States Patent
Patel et al.

(10) Patent No.: US 11,923,800 B2
(45) Date of Patent: Mar. 5, 2024

(54) SATURABLE REACTORS IN GENERATOR CONTROL UNITS

(71) Applicant: Hamilton Sundstrand Corporation, Charlotte, NC (US)

(72) Inventors: Dhaval S. Patel, Schaumburg, IL (US); Adrian E. Vandergrift, Rockton, IL (US); Sunil S. Patel, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 27 days.

(21) Appl. No.: 17/738,631

(22) Filed: May 6, 2022

(65) Prior Publication Data

US 2023/0361700 A1    Nov. 9, 2023

(51) Int. Cl.
*H02M 7/04* (2006.01)
*H02P 9/48* (2006.01)
*H02P 101/30* (2015.01)
*H02P 103/20* (2016.01)

(52) U.S. Cl.
CPC ............ *H02P 9/48* (2013.01); *H02P 2101/30* (2015.01); *H02P 2103/20* (2015.01)

(58) Field of Classification Search
CPC .... B64D 2221/00; H02P 2101/30; H02P 9/48
See application file for complete search history.

(56) References Cited

U.S. PATENT DOCUMENTS

| 3,370,221 | A  | * | 2/1968 | Plette ................... H02P 9/36 363/91 |
| 7,050,313 | B2 |   | 5/2006 | Huang et al. |
| 7,262,521 | B2 |   | 8/2007 | Dooley et al. |
| 10,122,306 | B2 |   | 11/2018 | Rozman et al. |
| 10,981,667 | B2 |   | 4/2021 | Knope et al. |
| 2007/0257558 | A1 |   | 11/2007 | Berenger |
| 2017/0019047 | A1 | * | 1/2017 | Rozman ............... H02P 9/00 |
| 2019/0308511 | A1 |   | 10/2019 | Bindl et al. |

FOREIGN PATENT DOCUMENTS

GB    1036242 A    7/1966

OTHER PUBLICATIONS

Extended European Search Report dated Sep. 19, 2023, issued during the prosecution of European Patent Application No. EP23171712.5.

* cited by examiner

*Primary Examiner* — Sean Gugger
(74) *Attorney, Agent, or Firm* — Locke Lord LLP; Joshua L. Jones; Scott D. Wofsy

(57) ABSTRACT

A system includes a generator control unit (GCU). The GCU includes a saturable reactor and a rectifier. Each of the saturable reactor and the rectifier has a separate input to receive AC power from a separate respective permanent magnet generator (PMG). A method includes supplying AC power from a first permanent magnet generator (PMG) of a generator to a saturable reactor of a generator control unit (GCU) that is operatively connected to control the generator. The method includes supplying AC power from a second PMG to a rectifier of the GCU, wherein the first PMG supplies a lower AC voltage to the saturable reactor than the second PMG supplies to the rectifier.

8 Claims, 1 Drawing Sheet

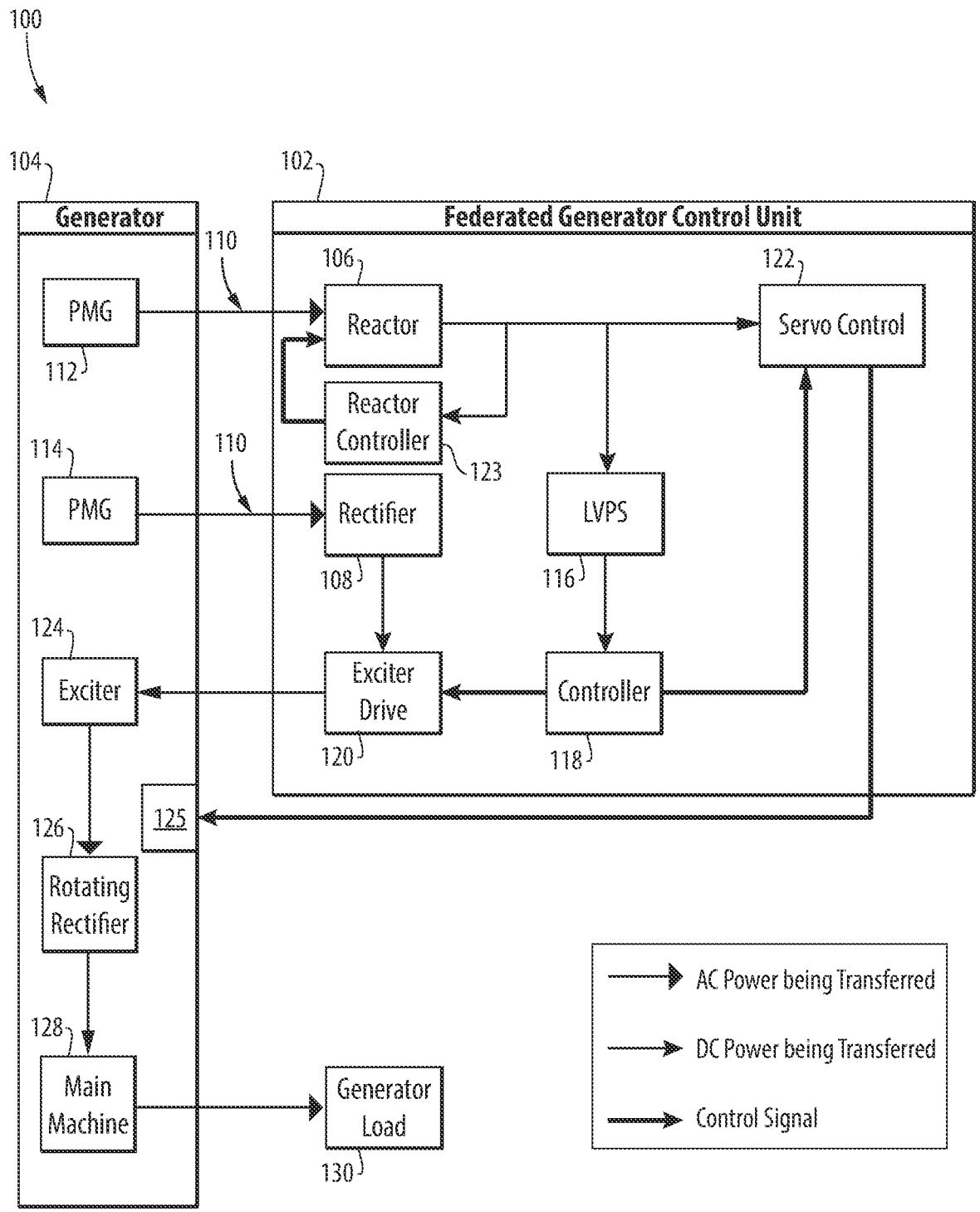

SATURABLE REACTORS IN GENERATOR CONTROL UNITS

BACKGROUND

1. Field

The present disclosure relates to generator control, and more particularly to saturable reactors for generator control.

2. Description of Related Art

In a typical electric power generation system (EPGS) a controller excitation system architecture is utilized on constant frequency systems. The system typically utilizes four stages: permanent magnet generator (PMG), servo drive, excitation and main machine, in order to control the output voltage of the system under any load condition. The generator control unit (GCU) is a federated component, which is typically found in the electrical equipment (EE) bay of the aircraft. An alternate system has the GCU and generator are part of the same line replaceable unit (LRU). This system can be optimized for smaller aircraft which can allow for the controller to be packaged with the generator.

The conventional techniques have been considered satisfactory for their intended purpose. However, there is an ever present need for improved systems and methods for generator control. This disclosure provides a solution for this need.

SUMMARY

A system includes a generator control unit (GCU). The GCU includes a saturable reactor and a rectifier. The saturable reactor and the rectifier each have a separate input to receive AC power from a separate respective permanent magnet generator (PMG).

The saturable reactor and the rectifier can be configured such that the saturable reactor receives a lower input AC voltage than the rectifier and such that the saturable reactor outputs a lower DC voltage than the rectifier. The GCU can include a low voltage power supply (LVPS) operatively connected to receive DC power output from the saturable reactor. The LVPS can be configured to convert DC power received from the saturable reactor to a lower voltage for output.

The GCU can include a controller operatively connected to receive DC power from the LVPS. The controller can be configured to output a control signal for excitation of a generator.

The GCU can include an exciter drive operatively connected to receive the control signal from the controller. The exciter drive can be configured to output DC exciter current to the generator. The exciter drive can be operatively connected to receive DC power from the rectifier.

The GCU can include a servo control operatively connected to receive DC power output from the saturable reactor and to receive a control signal from the controller. The servo control can be configured to control a servo motor in a generator to control generator output over a rage of rotational speeds of the generator.

The GCU can include a reactor controller operatively connected to receive DC power output from the saturable reactor. The reactor controller can be configured and operatively connected to output a control signal to the saturable reactor to control the saturable reactor. The reactor controller can be configured to increase a feedback signal to the saturable reactor to oppose flux in the saturable reactor core if output from the saturable reactor exceeds a setpoint, and to decrease the feedback signal if output of the saturable reactor goes below the setpoint The system can include a generator that is federated from the GCU. The generator can include a first PMG operatively connected to provide AC power to the saturable reactor. A second PMG of the generator can be operatively connected to provide AC power to the rectifier.

The generator can include an exciter operatively connected to receive DC exciter current from the GCU. The exciter can be configured to output AC power.

The generator can include a rotating rectifier operatively connected to receive the AC power from the exciter. The rotating rectifier can be configured to output DC power.

The generator can include a main machine operatively connected to receive the DC power from the rotating rectifier. The main machine can be configured to output AC power to a generator load.

A method includes supplying AC power from a first permanent magnet generator (PMG) of a generator to a saturable reactor of a generator control unit (GCU) that is operatively connected to control the generator. The method includes supplying AC power from a second PMG to a rectifier of the GCU, wherein the first PMG supplies a lower AC voltage to the saturable reactor than the second PMG supplies to the rectifier.

The method can include powering an exciter drive of the GCU with DC power from the rectifier. The method can include powering an exciter of the generator with DC power from the exciter drive. The method can include powering a controller, servo control, and reactor controller of the GCU with DC power derived from the saturable reactor. The method can include using the exciter to drive a main machine of the generator to power a generator load.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain FIGURES, wherein:

FIG. 1 is a schematic view of an embodiment of a system constructed in accordance with the present disclosure, showing the interconnections of the generator control unit (GCU) to the generator.

DETAILED DESCRIPTION OF THE PREFERRED EMBODIMENTS

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. The systems and methods described herein can be used to federate a generator control unit (GCU) from a generator, where a saturable reactor is used to supply power to the GCU.

The system 100 includes a generator control unit (GCU) 102 and a generator 104 that are federated from one another. The generator can be an IDG (integrated drive generator) aboard an aircraft, for example. The GCU 102 includes a saturable reactor 106 and a rectifier 108. The rectifier 108 can be a six pulse rectifier with a snubber circuit to condition the DC voltage, or any other suitable rectifier configuration.

The saturable reactor 106 and the rectifier 108 each have a separate respective input 110 to receive AC power from a separate respective permanent magnet generator (PMG) 112, 114. The saturable reactor 106 and the rectifier 108 are configured such that the saturable reactor 106 receives a lower input AC voltage than the rectifier 108, and such that the saturable reactor 106 outputs a lower DC voltage than the rectifier 108.

The GCU 102 includes a low voltage power supply (LVPS) 116 operatively connected to receive DC power output from the saturable reactor 106. The LVPS 116 is configured to convert DC power received from the saturable reactor 106 to a lower voltage for output. The GCU 102 includes a controller 118 operatively connected to receive the DC power from the LVPS 116, i.e. the LVPS 116 outputs the proper DC power voltage and amperage to power the controller 118. The controller 118 is configured to output a control signal for excitation of the generator 104. The controller 118 can be a DSP (digital signal processor), FPGA (field programmable gate array), or the like. The controller 118 receives voltage and current inputs from the system 100 and sets the excitation requirements to meet the load demand on the generator 104. The controller 118 does this by setting the duty cycle of the exciter drive 120 to achieve an excitation current. The controller 118 also controls the servo control 122 to control the generator input speed.

The GCU 102 includes an exciter drive 120 operatively connected to receive the control signal from the controller 118. The exciter drive 120 is configured to output DC exciter current to the generator 104. The exciter drive 120 is operatively connected to receive its DC power supplied from the rectifier 108. The exciter drive 120 can use a two switch forward configuration to control the exciter current. The duty cycle for the switches set by the controller 118.

The GCU 102 includes a servo control 122 operatively connected to receive DC power output from the saturable reactor 106 and to receive a control signal from the controller 122. The servo control 122 is configured to control a servo motor 125 in the generator 104 to control generator output over a rage of rotational speeds of the generator 104, e.g. by adjusting a variable pitch wobbler in the generator 104.

The GCU 102 includes a reactor controller 123 operatively connected to receive DC power output from the saturable reactor 106. The reactor controller 123 is configured and operatively connected to output a control signal to the saturable reactor 106 to control the saturable reactor 106.

The control signal from the reactor controller 123 induces flux into the core of the saturable reactor 106 which opposes the flux direction created by the PMG input to the saturable reactor 106. This feedback delays the saturation of the core in the saturable reactor 106. With no feedback signal the saturable reactor core saturates quickly and passes half-wave rectified PMG input out of the saturable reactor 106. If the saturable reactor 106 output goes above the regulation setpoint, the reactor controller 123 responds by increasing the feedback signal. This delays the saturation of the saturable reactor (106) core and decreases the output voltage from the saturable reactor 106. Likewise, if the saturable reactor 106 output goes below the regulation setpoint, the reactor controller 123 responds by decreasing the feedback signal. This speeds up the saturation of the saturable reactor (106) core and increases the output voltage from the saturable reactor 106.

The generator 104 and GCU 102 are federated from one another, and can be located in remote locations from one another. For example, the GCU 102 can be located in an aircraft electrical equipment (EE) bay, whereas the generator 104 can be located in the aircraft engine. The generator 104 includes the first PMG 112 operatively connected to provide AC power to the saturable reactor 106. The second PMG 114 of the generator is operatively connected to provide AC power to the rectifier 108. Each of the PMG's 112, 114 can include a three phase armature on the stator of the generator 104 and a rotating field which has a set of magnets creating the field. Each PMG 112, 114 can have output that is three phase AC power. In some instances, the power can be single phase AC. It is also contemplated that the two PMG's 112, 114 can be combined into a single PMG with two separate windings, one configured for each of the GCU inputs 110.

The generator 104 includes an exciter 124 operatively connected to receive DC exciter current from the GCU 102. The exciter 124 is configured to output AC power. The exciter 124 can be a wound field synchronous machine, e.g. including a three phase rotating armature and a stationary field winding. The exciter 124 can be a brushless exciter.

The generator includes a rotating rectifier 126 operatively connected to receive the AC power from the exciter 124. The rotating rectifier 126 is configured to output DC power.

The generator 104 includes a main machine 128 operatively connected to receive the DC power from the rotating rectifier 126. The main machine 128 is configured to output AC power to a generator load 130. The main machine 128 can be a wound field synchronous machine, where the rotor is a wound field and the stator is a three phase armature. The main machine 128 produces the output power for the generator 104, where the load 130 is connected to the outputs of the generator 104. The main machine voltage and current are controlled by the field current input from the rotating rectifier 126. For aircraft systems the load 130 can be a constant voltage load. The GCU 102 can sense the voltage at the point of regulation and adjust excitation such that the voltage is constant. In the event of a fault or failure of a load, the GCU 102 has the ability to adjust the excitation in order to clear the fault or to shut the system down completely so that the failure does not propagate.

A method includes supplying AC power from a first PMG 112 of a generator 104 to a saturable reactor 106 of a GCU 102 that is operatively connected to control the generator 104. The method includes supplying AC power from a second PMG 114 to a rectifier 108 of the GCU, wherein the first PMG 112 supplies a lower AC voltage to the saturable reactor 106 than the second PMG 114 supplies to the rectifier 108.

The method includes powering an exciter drive 120 of the GCU 102 with DC power from the rectifier 108. The method includes powering an exciter 124 of the generator with DC power from the exciter drive 120. The method includes powering a controller 118, servo control 122, and reactor controller of 123 the GCU 102 with DC power derived from the saturable reactor 106. The method includes using the exciter 124 to drive a main machine 128 of the generator 104 to power a generator load 130.

The system 100 can utilize a saturable reactor 106 that has amorphous cores in place of cobalt steel core. The amorphous cores have lower losses for higher frequency operation. When comparing amorphous cores to cobalt steel cores (at the same unsaturated flux density), the amorphous core will have lower losses as the frequency exceeds 1 kHz. The PMG frequencies can be from 800 Hz to 1.5 kHz. If temperature is an issue, a nanocrystalline core can be utilized for a given core of the saturable reactor 106. The nanocrystalline core is an amorphous core with additives. The material is heat treated such that the additives create nanocyrstalline structures. These nanocrystalline cores have higher temperature capabilities (e.g. 180-200° C.) than regular amorphous cores (e.g. 90-150° C.). By utilizing the core materials as disclosed herein, the losses can be reduced to a point where cooling of the reactor 106 is not required, i.e. it is not necessary for the saturable reactor 106 to be cooled by cooling fluid such as in traditional systems where generator coolant is used to cool saturable reactors.

The following paragraph states potential advantages of systems and methods as disclosed herein. Systems and method as disclosed herein can allow the use of a saturable reactor in place of a rectifier and power supply in the brushless excitation system where the GCU is federated from the generator. The saturable reactor can be a much more stable and reliable power supply. By using an amorphous or nanocrystalline core, the reactor will not need active cooling due to the reduction in losses. There can be a significant cost reduction by eliminating cobalt steel cores. Systems and methods as disclosed herein can provide clean decoupling of the controller power source and input to the DC to DC converter. This topology can also be utilized for other PMG systems such as converter regulators or flight control systems.

The methods and systems of the present disclosure, as described above and shown in the drawings, provide for federating a GCU from a generator, where a saturable reactor is used to supply power to the GCU. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A system comprising:
a generator control unit (GCU) including:
a saturable reactor; and
a rectifier, wherein each of the saturable reactor and the rectifier has a separate input to receive AC power from a separate respective permanent magnet generator (PMG), wherein the GCU further comprises a low voltage power supply (LVPS) operatively connected to receive DC power output from the saturable reactor, wherein the LVPS is configured to convert DC power received from the saturable reactor to a lower voltage for output, wherein the GCU further comprises a controller operatively connected to receive DC power from the LVPS, wherein the controller is configured to output a control signal for excitation of a generator.

2. The system as recited in claim 1, wherein the GCU further comprises an exciter drive operatively connected to receive the control signal from the controller, wherein the exciter drive is configured to output DC exciter current to the generator.

3. The system as recited in claim 2, wherein the exciter drive is operatively connected to receive DC power from the rectifier.

4. The system as recited in claim 1, wherein the GCU further comprises a servo control operatively connected to receive DC power output from the saturable reactor and to receive a control signal from the controller, wherein the servo control is configured to control a servo motor in a generator to control generator output over a rage of rotational speeds of the generator.

5. The system as recited in claim 1, wherein the saturable reactor and the rectifier are configured such that the saturable reactor receives a lower input AC voltage than the rectifier and such that the saturable reactor outputs a lower DC voltage than the rectifier.

6. A system comprising:
a generator control unit (GCU) including:
a saturable reactor; and
a rectifier, wherein each of the saturable reactor and the rectifier has a separate input to receive AC power from a separate respective permanent magnet generator (PMG), wherein the GCU further comprises a reactor controller operatively connected to receive DC power output from the saturable reactor, wherein the reactor controller is configured and operatively connected to output a control signal to the saturable reactor to control the saturable reactor, wherein the reactor controller is configured to increase a feedback signal to the saturable reactor to oppose flux in the saturable reactor core if output from the saturable reactor exceeds a setpoint, and to decrease the feedback signal if output of the saturable reactor goes below the setpoint.

7. A system comprising:
a generator control unit (GCU) including:
a saturable reactor; and
a rectifier, wherein each of the saturable reactor and the rectifier has a separate input to receive AC power from a separate respective permanent magnet generator (PMG);
a generator, the generator and GCU being federated from one another, the generator including:
a first permanent magnet generator (PMG) operatively connected to provide AC power to the saturable reactor; and
a second PMG operatively connected to provide AC power to the rectifier, wherein the generator further comprises an exciter operatively connected to receive DC exciter current from the GCU, wherein the exciter is configured to output AC power, wherein the generator further comprises a rotating rectifier operatively connected to receive the AC power from the exciter, wherein the rotating rectifier is configured to output DC power, wherein the generator further comprises a main machine operatively connected to receive the DC power from the rotating rectifier, wherein the main machine is configured to output AC power to a generator load.

8. A method comprising:
supplying AC power from a first permanent magnet generator (PMG) of a generator to a saturable reactor of a generator control unit (GCU) that is operatively connected to control the generator;
supplying AC power from a second PMG to a rectifier of the GCU, wherein the first PMG supplies a lower AC voltage to the saturable reactor than the second PMG supplies to the rectifier;
powering an exciter drive of the GCU with DC power from the rectifier;
powering an exciter of the generator with DC power from the exciter drive; and powering a controller, servo control, and reactor controller of the GCU with DC power derived from the saturable reactor.

\* \* \* \* \*